(12) United States Patent
Brisley et al.

(10) Patent No.: US 6,413,483 B1
(45) Date of Patent: Jul. 2, 2002

(54) CATALYTIC CONVERTER FOR A LEAN BURN INTERNAL COMBUSTION ENGINE

(75) Inventors: Robert James Brisley; Mark Brogan; Antony David Clark, all of Cambridge (GB)

(73) Assignee: Johnson Matthey Public Limited Company, London (GB)

( * ) Notice: Subject to any disclaimer, the term of this patent is extended or adjusted under 35 U.S.C. 154(b) by 0 days.

(21) Appl. No.: 09/446,688

(22) PCT Filed: Jun. 24, 1998

(86) PCT No.: PCT/GB98/01838

§ 371 (c)(1), (2), (4) Date: Mar. 17, 2000

(87) PCT Pub. No.: WO99/00177

PCT Pub. Date: Jan. 7, 1999

(30) Foreign Application Priority Data

Jun. 26, 1997 (GB) ............................................. 9713428

(51) Int. Cl.$^7$ .............................. B01J 8/00; B01J 23/02; B01J 23/04; B01J 23/42; C01B 21/20

(52) U.S. Cl. ............................... 423/239.1; 423/213.2; 423/213.5; 502/304; 502/328; 502/330; 502/339; 502/340; 502/344; 60/299

(58) Field of Search ............................... 423/212, 213.2, 423/213.5, 239.1; 502/304, 328, 330, 339, 340, 344; 60/299

(56) References Cited

U.S. PATENT DOCUMENTS

| 4,128,506 | A | * | 12/1978 | Hegedus et al. | ......... 423/213.5 |
| 5,057,483 | A | * | 10/1991 | Wan | ............................ 502/304 |
| 5,130,109 | A | * | 7/1992 | Wan | ........................ 423/213.2 |
| 5,459,119 | A | | 10/1995 | Abe et al. | |
| 5,490,977 | A | * | 2/1996 | Wan et al. | .................... 423/210 |
| 5,575,983 | A | | 11/1996 | Suzuki et al. | |
| 5,681,788 | A | * | 10/1997 | Kanesaka et al. | .............. 502/65 |
| 5,753,580 | A | * | 5/1998 | Hayashi et al. | .............. 502/304 |
| 6,051,529 | A | * | 4/2000 | Brezny | ........................ 502/302 |

FOREIGN PATENT DOCUMENTS

| EP | 0 560 991 A1 | | 9/1993 |
| EP | 0 625 633 | * | 11/1994 |
| EP | 0 669 157 A1 | | 2/1995 |
| EP | 0 664 147 A2 | | 7/1995 |
| EP | 0 716 876 A1 | | 6/1996 |
| EP | 0 771 584 A1 | | 5/1997 |
| EP | 0 814 242 A1 | | 12/1997 |
| JP | 03 196841 A | | 8/1991 |
| JP | 05 076771 A | | 3/1993 |
| WO | WO 95/00235 | | 1/1995 |
| WO | 95/35152 | * | 12/1995 |

* cited by examiner

Primary Examiner—Steven P. Griffin
Assistant Examiner—Christina Ildebrando
(74) Attorney, Agent, or Firm—Ratner & Prestia

(57) ABSTRACT

A layered exhaust gas catalyst containing Pt in a first layer and Rb in a second layer is more selective for catalyzing the reaction between $NO_x$ and/or nitrate with hydrocarbons and/or CO than for catalyzing the reaction between hydrocarbons and/or CO with oxygen. $NO_x$ can be reduced to $N_2$ under constant lean to stoichiometric conditions without the need for rich spikes.

11 Claims, 2 Drawing Sheets

CATALYTIC CONVERTER FOR A LEAN BURN INTERNAL COMBUSTION ENGINE

Figure 1:
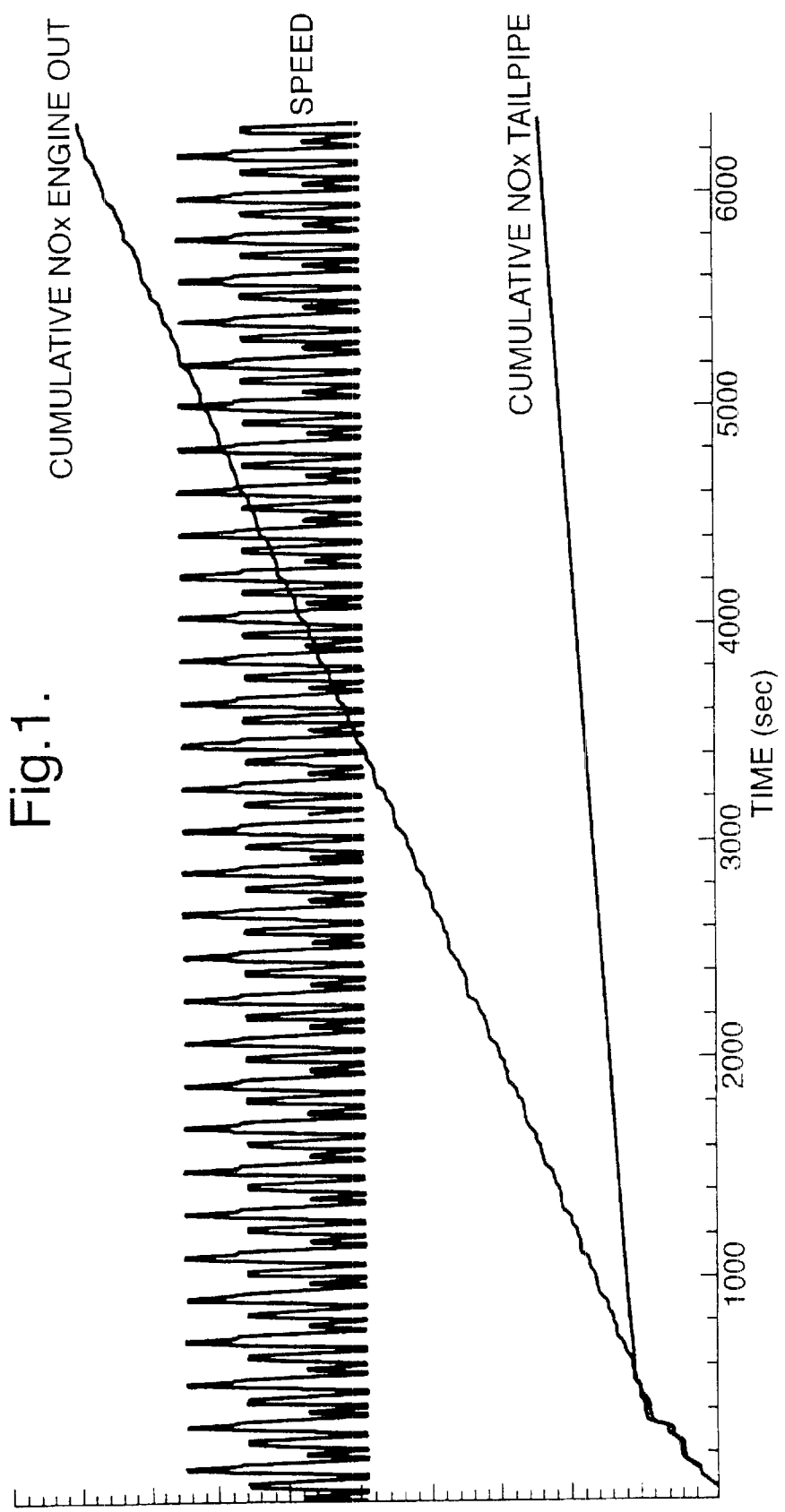

The present invention concerns improvements in emissions control, especially in the control of NOx under lean conditions.

The problems of controlling regulated emissions from internal combustion engines are well known. A particular difficult), is the reduction of NOx to in the case of "lean-burn" motors of various types, because there is generally an excess of oxygen in the exhaust gases, making reduction reactions more difficult. There are commercial and environmental pressures encouraging lean-burn engines, because of their fuel economy. At the same time, however, there are technical pressures such as the difficulty in reduction of NOx already mentioned and the generally cooler exhaust gases caused by excess air in turn making it more difficult to reach temperatures over a catalytic convertor at which adequate conversion takes place.

The best-known approach for NOx conversion for lean-burn engines is applied commercially by the inclusion in the catalyst of a NOx storage component such as Ba, Ca etc, which operates to store NOx during lean operation. The NOx storage component releases absorbed NOx when the oxygen content of the exhaust gas is lowered. For example, EP 560991 describes such a system; lowering of the oxygen content of the exhaust gases is achieved by making the exhaust gases rich or stoichiometric by controlling the airfuel ratio. Various techniques are available to achieve this, primarily involving designing the engine management system to provide rich "spikes" or excursions during normal lean running. It is our belief that all known practical examples of lean-burn engines incorporating such NOx storage concepts utilise either deliberate engine management strategies which provide $\lambda \leq 1$ excursions according to a predetermined assessment of the approach of saturation of the NOx storage component, or utilise the natural fluctuation of $\lambda$ less than 1 upon acceleration or some other part of the engine operating cycle.

In addition to the aforesaid EP 560991, other proposals to treat the exhaust gases from gasoline motors which operate at least predominately in the lean burn region, are disclosed in U.S. Pat. No. 5,575,983 (Toyota) which uses a catalyst incorporating a NOx storage component in combination with an alumina support incorporating lithium to treat sulphur oxides and sulphates. Toyota's EP 664147 describes a triple component catalyst arranged in series. Toyota's EP 716876 discloses a layered catalyst, the first layer containing NOx-occluding material and palladium and the second layer incorporated platinum and palladium. Another layered catalyst construction is shown in WO 95/00235, although this appears to be most relevant for motors operating near stoichiometry. This latter layered catalyst has palladium in both layers, and may have BaO (a NOx storage component) in the first (innermost) layer, together with ceria zirconia, $La_2O_3$ etc.

We have developed a fundamentally different method of reducing NOx in lean-burn engines, which offers much improved flexibility to engine and car designers and primarily relies upon catalyst design in combination with the chemistry of the exhaust gases.

During lean operation, engines (either homogeneous or stratified combustion designs) produce exhaust gases containing variable quantities of oxygen, nitrogen oxides, carbon monoxide and a variety of hydrocarbon species. At the stoichiometric point ($\lambda=1$) the reducing species and the oxidising species are in chemical balance. We believe, although we do not wish to be limited in any way by such belief, that at least in such lean burn engines as the modem generation of gasoline direct injection engines, there are microvariations in exhaust gas composition even under constant running conditions, that permit the present novel catalytic convertors to reduce NOx even under lean conditions.

The present invention provides a catalytic convertor for a lean-burn engine comprising a catalyst component capable of storing NOx, characterised in that a further catalyst component is included which exhibits greater selectivity for catalysing the reaction between NOx and/or nitrate with hydrocarbons and/or CO than catalysing the reaction between hydrocarbons and/or CO with oxygen.

It is also believed to be a feature of the present invention that the stored NOx, herein described as "nitrate" (although other nitrogen oxide species may also be present on the surfaces of the catalyst components) preferentially reacts with gaseous hydrocarbon and/or CO. Desirably, the catalyst components are designed to be deficient in oxygen and/or oxidising species compared to the exhaust gas, under normal running conditions.

NOx storage components suitable for use in the present invention include one or more alkali metal or alkaline earth metal compounds.

The present invention makes it possible to operate lean-burn engines of various types, especially direct-injection gasoline engines, constantly in the lean mode. This offers considerable promise in improved fuel consumption and may offer improvements in driveability. Additionally, the fundamentally different approach, relying on a catalyst designed to have the specified selectivity rather than on the storage of NOx, offers the skilled person greater opportunities for catalyst formulation than is the case with a conventional NOx storage catalyst. It will be readily appreciated that a catalyst that depends upon NOx storage will become saturated and will require periodic regeneration. In the present invention, for reasons that are not yet fully understood, NOx does not saturate the catalyst, although there may be, on the molecular level, storage of NOx as nitrate on the surface of certain of the catalyst components.

In accordance with the present invention. the catalyst is designed and formulated to achieve the desired selectivity. It is believed that following the teaching of the present invention regarding the desirability of such selectivity, the skilled person can achieve such selectivity in a number of ways. A suitable catalyst is a supported catalyst with a platinum group metal and a NOx storage component together effective to catalyze the oxidation of NO to $NO_2$ and/or $NO_3$ in one layer and a second layer containing a platinum group metal effective to reduce NO to $N_2$. Preferably, the catalyst comprises a first layer comprising platinum and barium or calcium carried on a high surface area alumina-containing support. Preferably, the second layer of the catalyst comprises rhodium and cerium carried on a high surface area support which does not contain alumina. More preferably, there is no significant quantity of rhodium in the first layer, and no significant quantity of platinum or NOx storage component in the second layer.

A modification of the above-described catalyst includes one or more interlayers of porous material between the first and second layers. It is believed that such further layer(s) may assist the separation of the catalytic functions of the two layers, and improvements in results after aging experiments have been observed. Thus, after deposition of the first layer, and impregnation with the first platinum group metal, a further layer of porous washcoat, desirably an aluminaceria-zirconia mix, is deposited. This is preferably impregnated with a NOx storage component or precursor, especially a suitable barium salt, and fired under conditions and for a time to produce a crystalline ceria-zirconia mixed oxide therein. The second layer may then be deposited, as described herein. In this modification, it is preferred that the first layer, comprises a washcoat of alumina only and contains platinum, and also contains a potassium compound.

It goes without saying that the catalytic convertor must also be capable of meeting the statutory regulations for hydrocarbon and carbon monoxide emissions. The skilled person understands these requirements and how they may be met using platinum group metal catalysts, optionally in combination with base metals, oxides such as alumina, ceria, zirconia, silica and mixtures as well as mixed oxides thereof, and a flow-through ceramic or metal honeycomb catalyst support.

General principles well known in catalyst formulation and conventional preparation methods may be followed to deposit washcoats and to impregnate catalyst components with precursors or salts of the active components. If desired, the washcoat may contain other desired components for each layer, either as solution(s) or possibly pre-deposited on washcoat particles. In particular, the catalyst may be modified to contain hydrocarbon-trapping components, such as zeolites and modified zeolites. Conventional processing includes firing to consolidate washcoat layers and to carry out necessary reactions to yield the desired final product.

A further embodiment of the present invention incorporates an absorbent for sulphur oxides (frequently abbreviated to "SOx")upstream of the novel catalytic convertor of the invention. We refer to our EP 814242 which discloses generally usable technology for such variant. A yet further embodiment desirably uses low-sulphur fuel (eg less than 50 ppm S) and low-sulphur lubricants, eg synthetic lubricants rather than those refined from crude oil, together with the novel catalytic convertor of the present invention.

Figure 2:
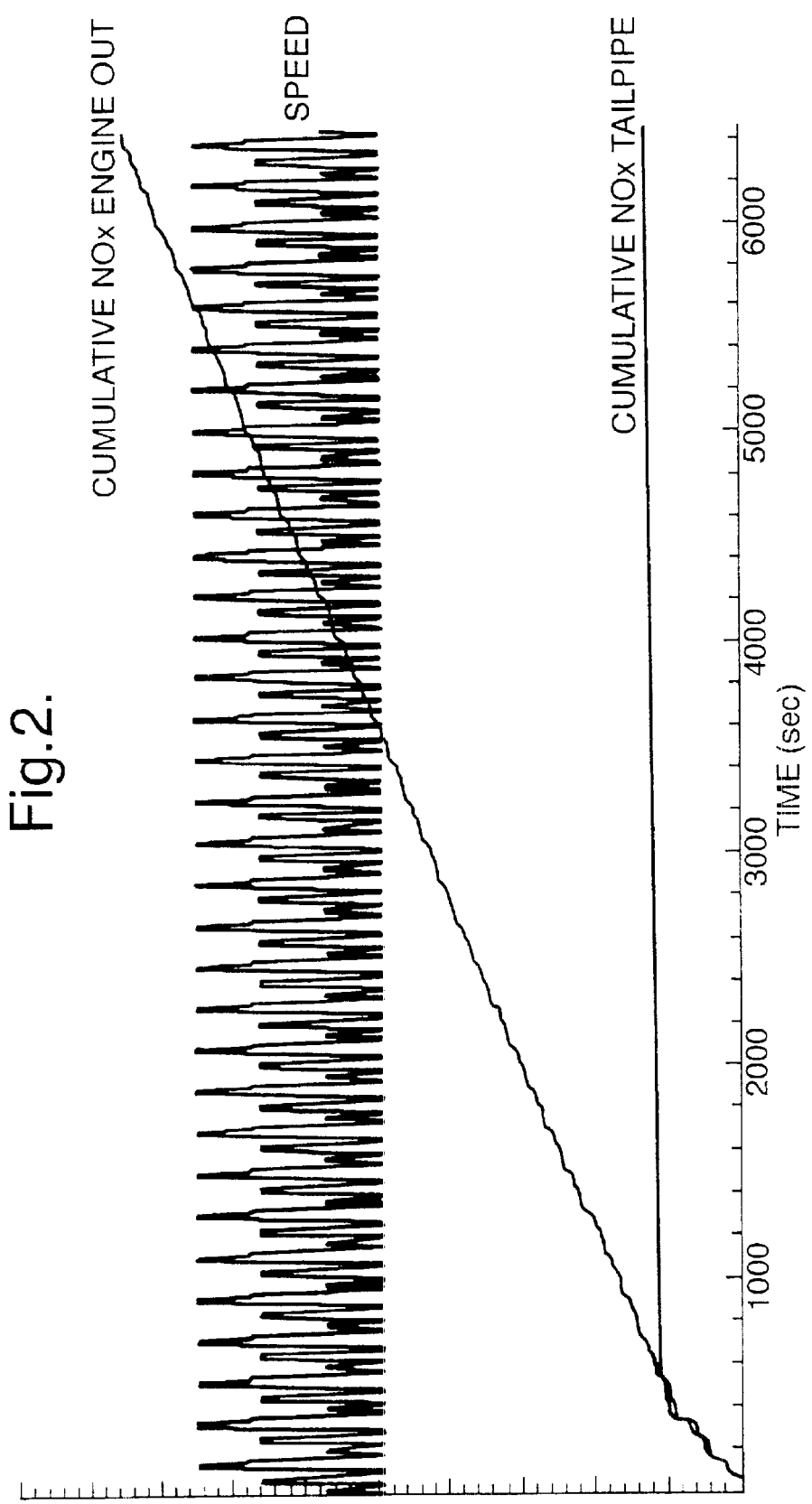

The invention is illustrated with reference to the accompanying drawings, in which FIG. 1 is a chart showing emissions from a direct-injection engine fitted with a conventional NOx-trap catalyst, and FIG. 2 is a similar chart for the same engine fitted with a selective catalyst according to the invention.

A Mitsubishi Galant GDi was fitted with a conventional commercial high efficiency lean NOx Pt/Rh catalyst supported on an alumina washcoat carried on a 400 cells/square inch cordeirite monolith. The catalyst formulation contains Ba which acts as a NOx store. The engine is controlled to run lean and at no time does the air/fuel ratio go under $\lambda=1$ during the ECE test cycle.

Referring to FIG. 1, the speed is in the ECE cycle shown as a complex cycle, the accumulative NOx concentration is shown at two positions, before the catalyst ("engine out") and after the catalyst ("tailpipe"). It can be seen that engine out NOx accumulates steadily, whereas after about one minute the catalyst reaches operating temperature and begins to convert NOx to $N_2$. There is, however, a proportion of NOx which is not converted, so that the cumulative tailpipe emissions also increase constantly.

The same motor car was then fitted with an experimental catalyst whose preparation is described in detail below and the same tests performed. The results shown in FIG. 2 show, after the initial period, a flat trace of cumulative tailpipe NOx emissions, indicating that all of the NOx emitted from the engine is being converted. Additional studies have shown that the expected NOx storage capacity has been exceeded many-fold. It is interpreted that the experimental catalyst shows unexpected and valuable selectivity for the reaction between NOx and/or nitrate with hydrocarbons and/or CO compared to the reaction between hydrocarbons and/or CO with oxygen. It is also interpreted that the novel catalyst exhibits continual regeneration of the NOx storage component under normal conditions of use, and without engine management directed to providing rich excursions.

A supported catalyst useful in the present invention was prepared as follows:

Onto a 400 cells/in$^2$ (62 cells/cm$^2$) cordeirite honeycomb monolith, is deposited a catalyst washcoat underlayer of a slurry of a mixture of alumina, ceria and zirconia to give a total deposit of 2.0 g/in$^3$ (0.12 g/cm$^3$). The resulting monolith is fired for 1 hour in air at 500° C. A first catalyst layer is deposited onto the monolith by impregnating the washcoated monolith with a mixed solution of tetramine platinum dichloride and barium acetate, to yield an intimate mixture of platinum and barium. The barium acetate is deposited at a loading of 800 g/ft$^3$ of Ba (28 g/litre) and the platinum is deposited at a loading of 100 g/ft $^3$of Pt (3.5 g/litre). The monolith is fired again under the same conditions. A second washcoat layer is then deposited to yield a deposit of 1.0 g/in$^3$ (0.06 g/cm$^3$) of ceria-stabilised zirconia (11% $CeO_2$, 89% $ZrO_2$) in admixture with a solution of rhodium nitrate, to yield a deposit of 6 g/ft$^3$ (0.21 g/litre) of Rh in the second washcoat layer. The treated monolith is fired again under the same conditions and then a second impregnation is carried out using cerium acetate solution to deposit 400 g/ft$^3$ (14 g/litre) of Ce. The monolith is fired again under the same conditions.

What is claimed is:

1. A catalytic converter for a lean-burn engine comprising: a supported layered catalyst having a first layer containing platinum, potassium, and a barium NOx storage component carried on a washcoat comprising a mixture of at least two oxides selected from the group consisting of alumina, ceria, and zirconia, and a second layer containing rhodium carried on a washcoat comprising ceria and zirconia, and said catalytic converter further comprises an interlayer, disposed between said first layer and said second layer, containing a barium compound carried on a washcoat.

2. An engine having an exhaust gas treatment system including a catalytic converter according to claim 1, further comprising an SOx absorbent fitted between the engine and the catalytic converter.

3. A catalytic converter for a lean-burn engine comprising a supported layered catalyst having a first layer containing platinum and potassium carried on a washcoat comprising at least two of alumina, ceria and zirconia, a second layer containing rhodium carried on a washcoat comprising ceria and zirconia, and an interlayer, disposed between the first layer and the second layer, comprising a barium compound carried on a washcoat.

4. A lean-burn gasoline engine having an exhaust gas treatment system including a catalytic converter according to claim 3.

5. A lean-burn gasoline engine according to claim 4, further including engine management means which operates the engine under all or substantially all running conditions at $\lambda<1$.

6. An engine according to claim 4, wherein the engine is a gasoline direct injection engine.

7. An engine according to claim 4, further comprising an SOx absorbent fitted between the engine and the catalytic converter.

8. A vehicle including a lean-burn gasoline engine, engine management means which operates the engine under all or substantially all running conditions at $\lambda>1$ and an exhaust gas treatment system including a catalytic converter according to claim 3.

9. A method of controlling the emissions of $NO_x$ from a lean-burn engine comprising passing the exhaust gas from the engine over a catalytic converter according to claim 3.

10. A method according to claim 9, wherein the engine is controlled so that $\lambda$ does not fall below 1.

11. A catalytic converter for a lean-burn engine comprising a supported layered catalyst having a first layer containing platinum and a barium $NO_x$ storage component carried on a washcoat comprising at least two of alumina, ceria and zirconia, and a second layer containing rhodium carried on a washcoat which does not contain alumina.

\* \* \* \* \*

UNITED STATES PATENT AND TRADEMARK OFFICE
CERTIFICATE OF CORRECTION

PATENT NO.    : 6,413,483 B1  
DATED         : July 2, 2002  
INVENTOR(S)   : Robert James Brisley et al.

It is certified that error appears in the above-identified patent and that said Letters Patent is hereby corrected as shown below:

<u>Title page,</u>  
Item [57], ABSTRACT,  
Line 2, replace "Rb" with -- Rh --.

<u>Column 1,</u>  
Line 35, change "$\lambda \leqq 1$" to -- $\lambda \leq 1$ --.

<u>Column 2,</u>  
Line 2, change "modem" to -- modern --.

<u>Column 4,</u>  
Line 60, delete "$\lambda < 1$" and insert -- $\lambda > 1$ --.

Signed and Sealed this

Eighteenth Day of March, 2003

JAMES E. ROGAN  
*Director of the United States Patent and Trademark Office*